(12) United States Patent
Wei

(10) Patent No.: US 11,811,169 B2
(45) Date of Patent: Nov. 7, 2023

(54) MULTIFUNCTIONAL STAND AND STAND ASSEMBLY

(71) Applicant: Yao Hong Wei, Shenzhen (CN)

(72) Inventor: Yao Hong Wei, Shenzhen (CN)

( * ) Notice: Subject to any disclaimer, the term of this patent is extended or adjusted under 35 U.S.C. 154(b) by 223 days.

(21) Appl. No.: 17/412,277

(22) Filed: Aug. 26, 2021

(65) Prior Publication Data

US 2023/0034626 A1 Feb. 2, 2023

(30) Foreign Application Priority Data

Aug. 2, 2021 (CN) .......................... 202110881305.8

(51) Int. Cl.
| | | |
|---|---|---|
| *H04M 1/04* | (2006.01) | |
| *H01R 13/652* | (2006.01) | |
| *F16M 11/04* | (2006.01) | |
| *G06F 1/16* | (2006.01) | |
| *H04M 1/14* | (2006.01) | |
| *H01R 103/00* | (2006.01) | |

(52) U.S. Cl.
CPC ......... *H01R 13/652* (2013.01); *F16M 11/041* (2013.01); *F16M 11/043* (2013.01); *G06F 1/166* (2013.01); *H04M 1/04* (2013.01); *H04M 1/14* (2013.01); *F16M 2200/08* (2013.01); *H01R 2103/00* (2013.01)

(58) Field of Classification Search
CPC ...... H04M 1/04; H04M 1/14; F16M 2200/08; G06F 1/166
See application file for complete search history.

(56) References Cited

U.S. PATENT DOCUMENTS

| | | | | |
|---|---|---|---|---|
| 7,320,450 | B2 * | 1/2008 | Carnevali | ............... F16M 11/14 |
| | | | | 248/180.1 |
| 9,143,180 | B2 * | 9/2015 | Shen | ..................... H04B 1/3883 |
| 9,991,922 | B2 * | 6/2018 | Kovacs | ................... H04M 1/04 |
| 10,386,704 | B2 * | 8/2019 | Wengreen | ............ F16M 11/041 |
| 10,712,786 | B1 * | 7/2020 | Huang | ................ H04B 1/3877 |
| 11,131,422 | B2 * | 9/2021 | Tsui | ...................... F16M 11/041 |
| 2015/0172431 | A1 * | 6/2015 | Huang | ................. H04B 1/3883 |
| | | | | 455/575.8 |
| 2016/0150067 | A1 * | 5/2016 | Khaliqi | ................ F16M 11/041 |
| | | | | 455/556.1 |
| 2018/0167498 | A1 * | 6/2018 | Drakos | ............. F16M 11/2021 |
| 2018/0202601 | A1 * | 7/2018 | Kelly | ..................... F16M 11/14 |
| 2022/0055798 | A1 * | 2/2022 | Morris | ...................... B32B 7/09 |
| 2022/0228709 | A1 * | 7/2022 | Chao | ......................... F16B 1/00 |

* cited by examiner

*Primary Examiner* — Bradley Duckworth
(74) *Attorney, Agent, or Firm* — Andrew C. Cheng

(57) ABSTRACT

The present invention discloses a multifunctional stand and a stand assembly. The multifunctional stand includes a supporting part, a connection part and a magnet, where the supporting part is connected to the connection part, and a joint of the supporting part and the connection part is recessed inwards to form a recess; and the magnet is disposed at an end of the connection part far from the recess. The stand assembly includes a plug and the multifunctional described above. The multifunctional stand of the present invention can be used for other purposes when not supporting a mobile phone or a tablet computer, and is small in size and convenient to carry. The stand assembly of the present invention can prevent a metal plug from scratching other items when a charger is carried.

18 Claims, 9 Drawing Sheets

MULTIFUNCTIONAL STAND AND STAND ASSEMBLY

TECHNICAL FIELD

The present invention relates to the technical field of stands, and in particular, to a multifunctional stand and a stand assembly.

BACKGROUND

Currently, there are many types of common stands for mobile phones and tablet computers in the market. Generally, they may fall into several categories as below. 1. A telescopic clip with a clamping function is disposed at an end of a stand connected to a mobile phone or a tablet computer. 2. A bracket with a placing function is disposed at an end of a stand connected to a mobile phone or a tablet computer. 3. A base clip with a clamping function is disposed at an end of a stand connected to a tabletop. 4. A base platform capable of being placed on a tabletop is disposed at an end of a stand connected to the tabletop.

For a mobile phone with a smaller size, a stand usually has a telescopic clip and a base platform in cooperation. The telescopic clip can hold the mobile phone firmly, and the base platform can provide stable supporting. For a tablet computer with a larger size, a stand usually has a bracket and a base clip or a base platform in cooperation because a telescopic clip fails to hold the tablet computer conveniently. The tablet computer is large in size and also large in weight, and thus it can be stably placed on the bracket due to its dead weight.

The above-mentioned stand, in any form, can only play a role in supporting a mobile phone and a tablet computer and is single in function. When not used, the stand can only be left in idle and occupies a space. A stand with a telescopic clip, a bracket, a base clip and a base platform is relatively complex in structure, large in occupied size and not convenient to carry.

In addition, an existing charger for a mobile phone or a tablet computer usually includes a shell body and a metal plug. To ensure safety of charging, the shell body and the metal plug need to be fixedly connected to each other to avoid poor contact and other situations, i.e., the metal plug cannot be rotated to be accommodated in the shell body. Then, when a user goes on a business trip or travels carrying this charger, the metal plug is usually exposed to scratch other items in a suitcase or a backpack.

SUMMARY provide a multifunctional stand. The multifunctional stand can be used for other purposes when not supporting a mobile phone or a tablet computer, and the multifunctional stand is small in size and convenient to carry. A second objective of the present invention is to provide a stand assembly. The stand assembly can prevent a metal plug from scratching other items when a charger is carried.

The first objective of the present invention is achieved by the technical solutions as below.

A multifunctional stand includes a supporting part, a connection part and a magnet, where the supporting part is connected to the connection part, and a joint of the supporting part and the connection part is recessed inwards to form a recess; and the magnet is disposed at an end of the connection part far from the recess.

Further, the end of the connection part far from the recess has a flat abutting surface, and the magnet is located on an inner side of the flat abutting surface.

Further, the supporting part is spherical.

Further, the connection part is hemispherical, and a spherical end of the connection part is connected to the supporting part.

Further, a supporting part soft rubber sleeve sleeves an outer side of the supporting part.

Further, the supporting part and the connection part are integrally molded.

Further, weight reducing holes are provided in the supporting part.

Further, the end of the connection part far from the recess is provided with an accommodating cavity, a plug accommodating member is disposed in the accommodating cavity, an end face of the plug accommodating member far from the recess is provided with insertion holes adapted to insert a plug, the magnet is located in the accommodating cavity, and the magnet is located on an inner side of the end face of the plug accommodating member far from the recess.

Further, a plurality of supporting plates are disposed on an inner wall of the accommodating cavity; the plurality of supporting plates are annularly distributed, and tops of the plurality of supporting plates are adapted to form supporting faces; the magnet is annular; the plug accommodating member includes a body part and an end cap part, the end cap part is farther from the recess than the body part, the insertion holes are provided in the body part, the body part is adapted to penetrate through a center of the magnet, and the magnet is adapted to be clamped between the end cap part and the supporting faces.

Further, a magnet soft rubber sleeve sleeves an outer side of the magnet.

Further, an insertion hole soft rubber sleeve is disposed in each insertion hole, and end face annular soft rubber is disposed on the end face of the plug accommodating member far from the recess.

Further, the insertion hole soft rubber sleeves and the end face annular soft rubber are integrally molded.

Further, ribs are disposed in each insertion hole soft rubber sleeve in a length direction of the insertion hole soft rubber sleeve.

Further, the plug accommodating member is welded to the connection part through ultrasonic waves.

Further, a material of the plug accommodating member is ABS engineering plastic.

Further, a material of the supporting part soft rubber sleeve is TPE.

Further, a material of the insertion hole soft rubber sleeves and a material of the end face annular soft rubber are both TPE.

Further, a material of the supporting part and a material of the connection part are ABS engineering plastic.

The second objective of the present invention is achieved by the technical solutions as below.

A stand assembly includes a plug and the multifunctional stand, where the plug is adapted to be inserted into insertion holes of the multifunctional stand.

Further, the plug is a gallium nitride plug.

Compared with the prior art, the present invention has the beneficial effects as below.

(1) The multifunctional stand of the present invention can be used as a stand for a mobile phone or a tablet computer, can also be magnetically attracted to a bottom of a laptop to serve as a heightening block, and can further be magnetically attracted to a computer host to serve as a hook. In addition, the multifunctional stand is relatively small in size and can be conveniently carried.

(2) The stand assembly of the present invention can prevent a metal end of the plug from being exposed to scratch other items in a suitcase or a backpack.

In the figures: 1. Supporting part; 11. Supporting part soft rubber sleeve; 12. Weight reducing hole; 2. Connection part; 21. Accommodating cavity; 211. Supporting plate; 212. Supporting face; 3. Recess; 4. Plug accommodating member; 41. Body part; 411. Insertion hole; 42. End cap part; 421. End face annular soft rubber; 5. Magnet; 6. Plug; 7. Insertion hole soft rubber sleeve; 71. Rib; 8. Computer host; 9. Laptop; 100. Mobile phone; 200. Tablet computer; and 300. Auxiliary iron sheet.

DESCRIPTION OF EMBODIMENTS

To make the present invention easy to understand, the following will more comprehensively describe the present invention with reference to the relevant accompanying drawings. The exemplary embodiments of the present invention are given in the accompanying drawings. However, the present invention may be implemented in many different ways, but not to be limited to the embodiments as described herein. On the contrary, these embodiments are provided such that the content disclosed by the present invention is more thoroughly and comprehensively understood.

It should be noted that when one element is, as stated, "fixed to" another element, it may be directly on the another element, or there may be an element in between. When one element is deemed as being "connected to" another element, it may be directly connected to the another element, or there may be an element in between. The terms "vertical", "horizontal", "left", "right" and other similar expressions as used herein are for illustration only.

Unless otherwise defined, all technical and scientific terms as used herein have the same meanings as those usually understood by a person skilled in the art of the present invention. The terms used in the specification of the present invention herein are for description of the particular embodiments only and are not intended to limit the present invention. The term "and/or" as used herein includes any or all combinations of one or more relevant listed items.

As shown in FIG. 1 to FIG. 6, an embodiment of the present invention provides a multifunctional stand. The multifunctional stand at least includes a supporting part 1, a connection part 2 and a magnet 5. The supporting part 1 is connected to the connection part 2. A joint of the supporting part 1 and the connection part 2 is recessed inwards to form a recess 3. The magnet 5 is disposed at an end of the connection part 2 far from the recess 3.

Figure 9:
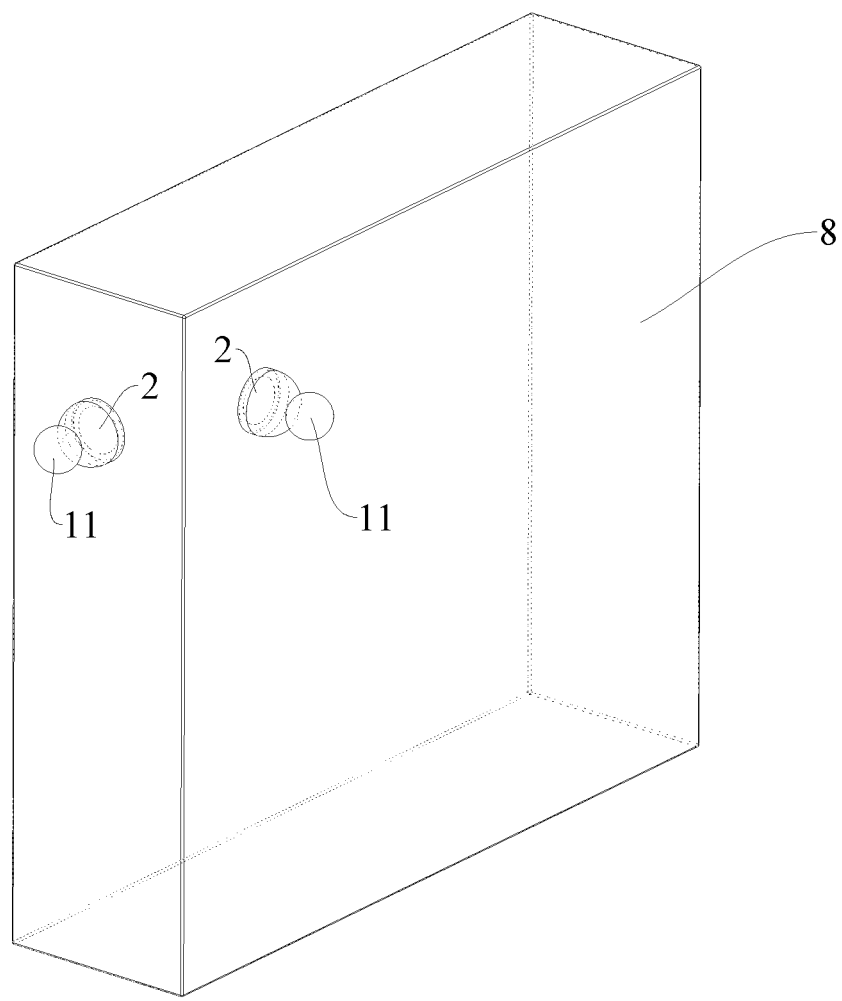
FIG. 9 is a schematic diagram illustrating cooperation of a multifunctional stand of the present invention and a computer host.

Referring to FIG. 9, when the multifunctional stand described above does not support a mobile phone 100 or a tablet computer 200, an end of the multifunctional stand provided with the magnet 5 can be magnetically attracted to a computer host 8. In this way, a user can hang a headset, a data cable and other items on the multifunctional stand quite conveniently. In addition, the joint of the supporting part 1 and the connection part 2 is recessed inwards to form the recess 3, so that the items hung on the multifunctional stand do not fall off easily, thereby achieving a good limiting effect. Due to magnetic attraction of the magnet 5, the user can conveniently take the multifunctional stand down from the computer host 8, and it is more convenient for the user to operate.

Figure 10:
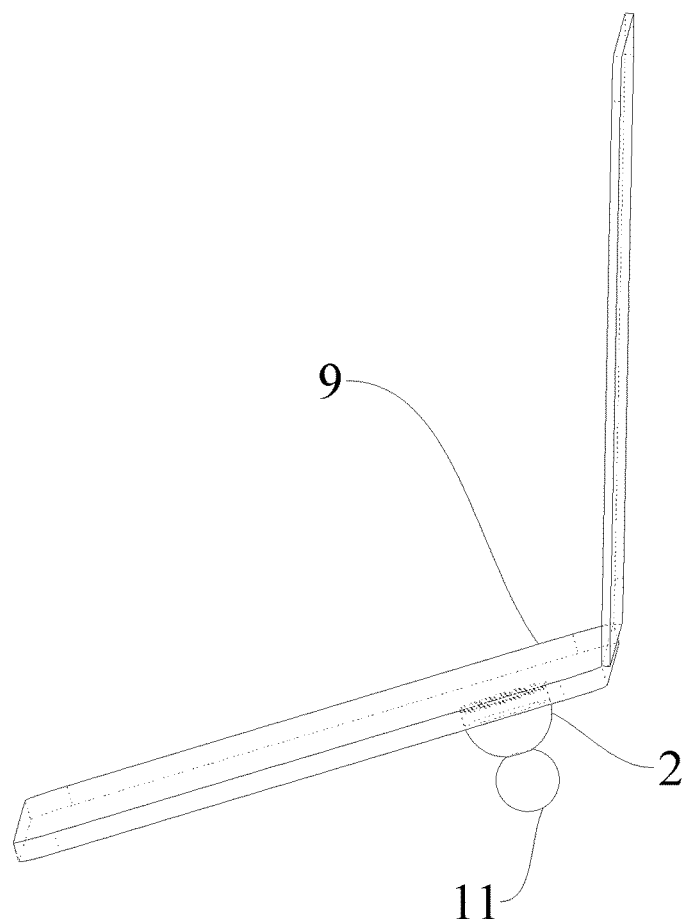
FIG. 10 is a schematic diagram illustrating cooperation of a multifunctional stand of the present invention and a laptop.
Figure 11:
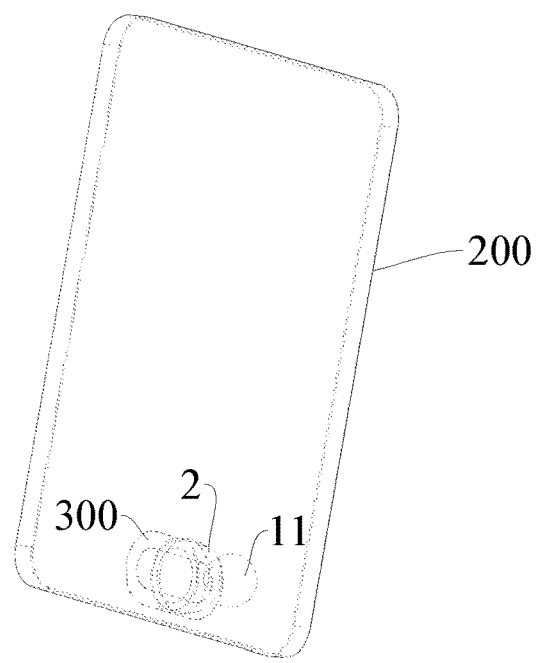
FIG. 11 is a schematic diagram illustrating cooperation of a multifunctional stand of the present invention and a tablet computer (vertically placed)
Figure 12:
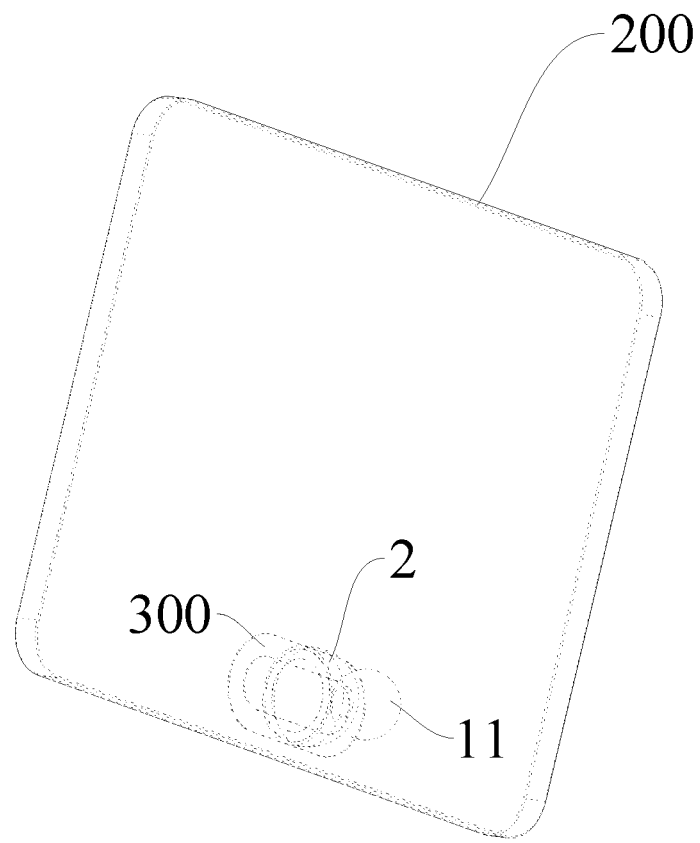
FIG. 12 is a schematic diagram illustrating cooperation of a multifunctional stand of the present invention and a tablet computer (horizontally placed)
Figure 13:
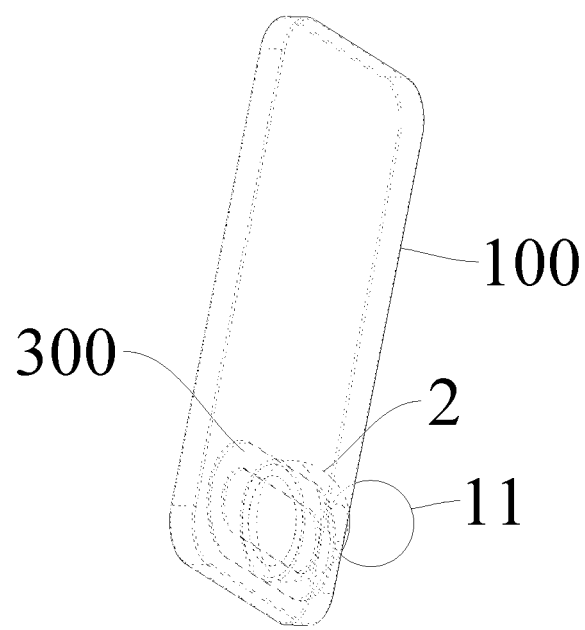
FIG. 13 is a schematic diagram illustrating cooperation of a multifunctional stand of the present invention and a mobile phone (vertically placed)
Figure 14:
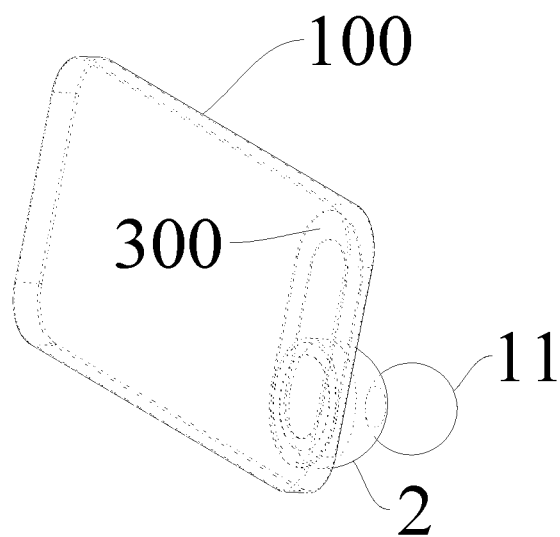
FIG. 14 is a schematic diagram illustrating cooperation of a multifunctional stand of the present invention and a mobile phone (horizontally placed)

Besides, referring to FIG. 10, the multifunctional stand can also be magnetically attracted to a bottom of a laptop 9 so as to heighten the bottom of the laptop 9, thereby facilitating cooling. On the other hand, the heightened bottom of the laptop 9 can relieve the fatigue of the user's wrist. It should be noted that to make the laptop 9 more stable, a plurality of multifunctional stands can be magnetically attracted to the bottom of the laptop 9.

Figure 15:
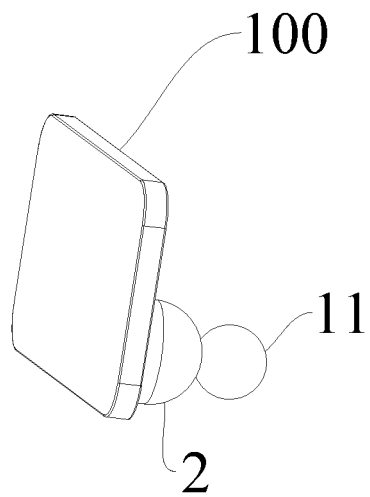
FIG. 15 is a schematic diagram illustrating cooperation of a multifunctional stand of the present invention and a mobile phone horizontally placed at a first inclination angle.
Figure 16:
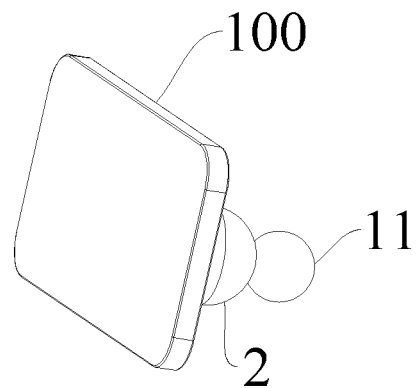
FIG. 16 is a schematic diagram illustrating cooperation of a multifunctional stand of the present invention and a mobile phone horizontally placed at a second inclination angle.
Figure 17:
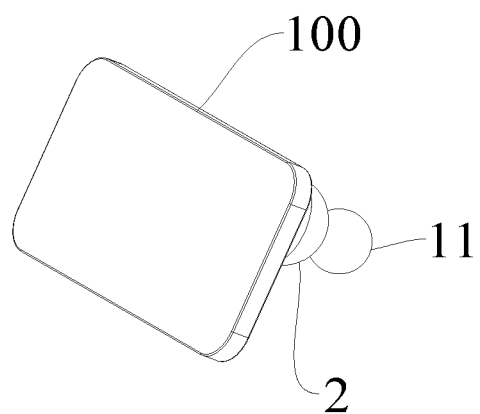
FIG. 17 is a schematic diagram illustrating cooperation of a multifunctional stand of the present invention and a mobile phone horizontally placed at a third inclination angle.

Referring to FIG. 11 to FIG. 14, when serving as a stand for a mobile phone 100 or a tablet computer 200, the multifunctional stand can function as a stand only by making the connection part 2 magnetically attracted to the mobile phone 100 or the tablet computer 200 and then placing the supporting part 1 onto a table, and this is very convenient. In addition, with a magnetic attraction connection mode, the connection part 2 can have a simpler structure than an existing telescopic clip or an existing bracket, thereby reducing a size and being conducive to carrying. In addition, referring to FIG. 15 to FIG. 17, when the mobile phone 100 is horizontally placed for use, users often have different demands for an inclination angle between the mobile phone and a supporting face (generally a tabletop). For example, someone likes to make the mobile phone 100 tend to be in an upright state, while some others like to make the mobile phone 100 tend to be in a flat state. In the present invention, in the case of using the multifunctional stand to support a mobile phone, when a magnetic attraction point of the mobile phone is disposed at a position of the mobile phone 100 close to the supporting face (generally the tabletop), the mobile phone 100 tends to be in an upright state, and when the magnetic attraction point of the mobile phone is disposed at a position of the mobile phone 100 far from the supporting face (generally the tabletop), the mobile phone 100 tends to be in a flat state. That is, in the present invention, only by changing the position of the magnetic attraction point on the mobile phone 100 for the multifunctional stand, an inclination angle of the mobile phone 100 can be adjusted to meet use demands of different people, which is quite convenient.

It should be noted that some mobile phones 100 or tablet computers 200 available on the market at present have a ferromagnetic property on the back side, while some others do not have. Mobile phones 100 or tablet computers 200 having a ferromagnetic property can be supported directly by the multifunctional stand in the above way. Those mobile phones 100 or tablet computers 200 having no ferromagnetic property can acquire a ferromagnetic property through an auxiliary iron sheet 300. That is, the auxiliary iron sheet 300 is attached to the back side of a mobile phone or a tablet computer through glue, and then the mobile phone or the tablet computer is supported by the multifunctional stand in the above way.

Figure 1:
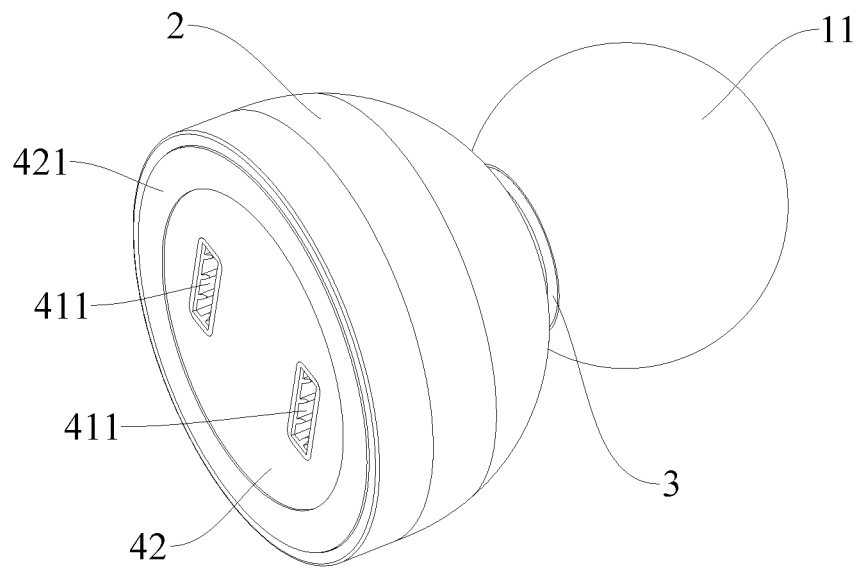
FIG. 1 is a schematic 3D view of a multifunctional stand of the present invention.

Preferably, referring to FIG. 1, the end of the connection part 2 far from the recess 3 has a flat abutting surface, and the magnet 5 is located on an inner side of the flat abutting surface. The flat abutting surface can make the multifunctional stand more firmly connected to other items when the multifunctional stand is magnetically attracted to the other items. The magnet 5 is located on the inner side of the flat abutting surface, so that the flat abutting surface can play a role in protecting the magnet 5 and prevent the magnet 5 from being damaged by bumps.

Figure 3:
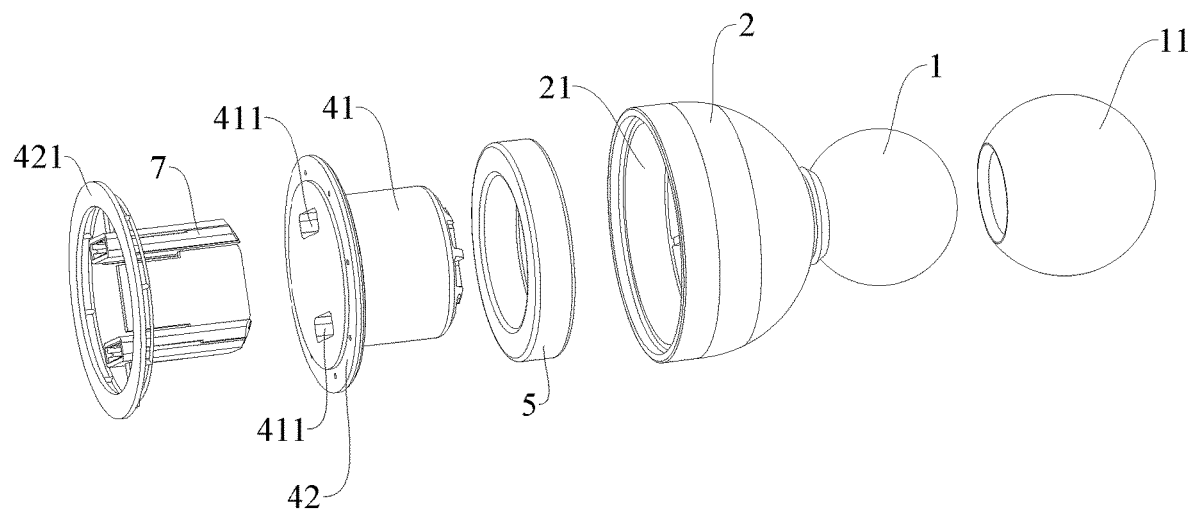
FIG. 3 is an exploded view of a multifunctional stand of the present invention.
Figure 4:
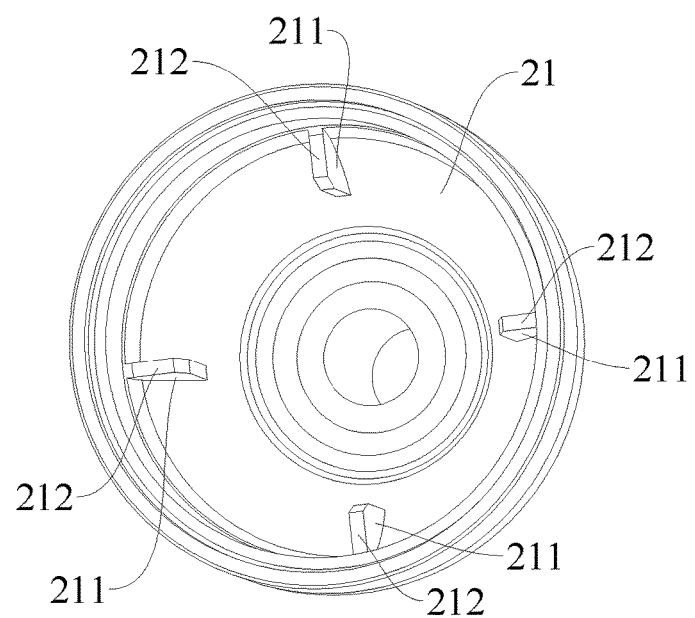
FIG. 4 is a schematic diagram illustrating an interior of a connection part in a multifunctional stand of the present invention.
Figure 5:
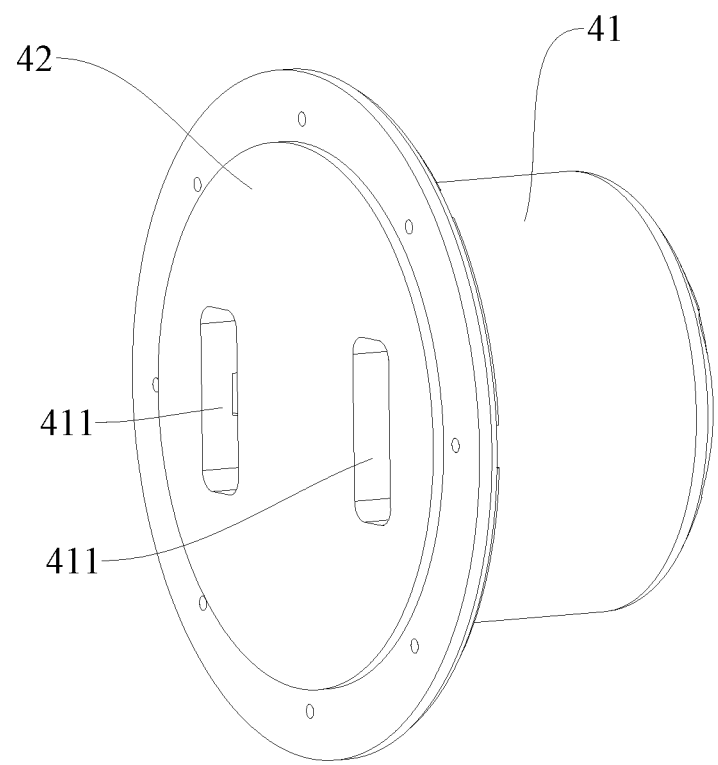
FIG. 5 is a schematic diagram of a plug accommodating member in a multifunctional stand of the present invention.

Preferably, referring to FIG. 3, the supporting part 1 is spherical. When the multifunctional stand serves as a stand for a mobile phone 100 or a tablet computer 200, the spherical supporting part 1, at any angle, can be in stable contact with the tabletop, so a user can directly make the connection part 2 magnetically attracted to the mobile phone 100 or the tablet computer 200 for use without considering the angle, which is quite convenient.

Preferably, referring to FIG. 3, the connection part 2 is hemispherical, and a spherical end of the connection part 2 is connected to the supporting part 1. With such a connection mode, the multifunctional stand can be more attractive. In addition, the spherical end of the connection part 2 is connected to the supporting part 1, so that a planar end of the connection part 2 abuts against a magnetically attracted item, thereby making magnetic attraction connection more reliable.

Figure 2:
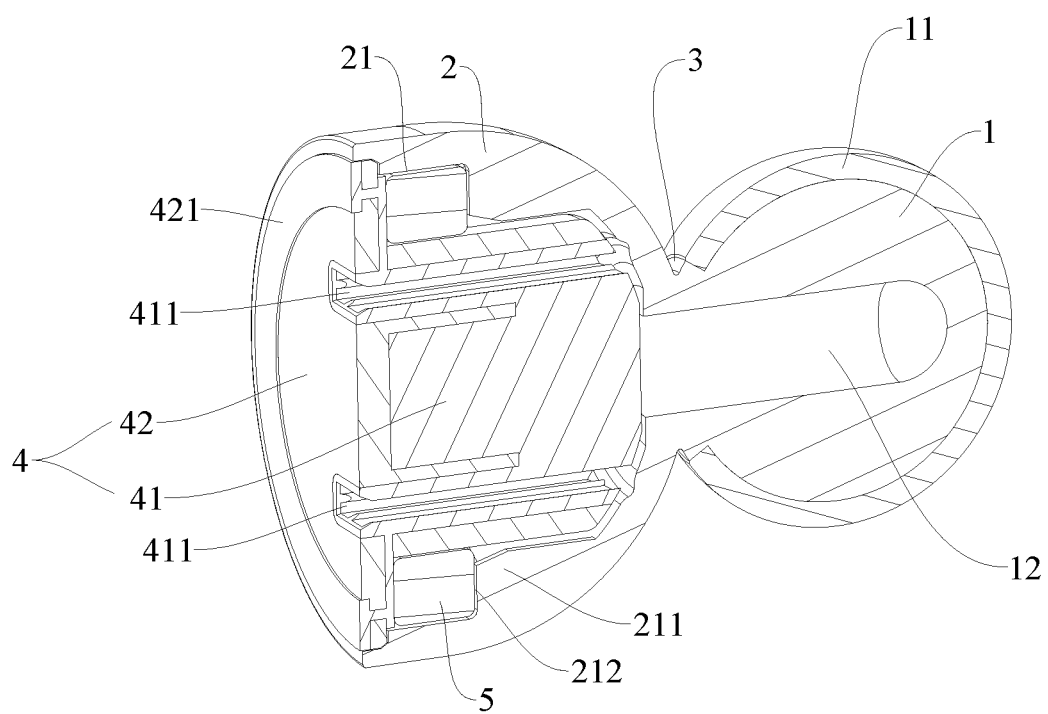
FIG. 2 is a sectional view of a multifunctional stand of the present invention.

Preferably, referring to FIG. 2 and FIG. 3, a supporting part soft rubber sleeve 11 sleeves an outer side of the supporting part 1. The supporting part soft rubber sleeve 11 can play a role in buffering and also makes hand feel better. For example, when the multifunctional stand serves as a stand for a mobile phone 100 or a tablet computer 200, the mobile phone 100 or the tablet computer 200 vibrates due to message arrival, and at the moment, the supporting part soft rubber sleeve 11 can prevent the supporting part 1 from jumping on the tabletop and play a role in buffering.

Preferably, the supporting part 1 and the connection part 2 are integrally molded. Integral molding can improve integrity of the multifunctional stand and can also reduce machining costs and improve production efficiency.

Preferably, referring to FIG. 2, weight reducing holes 12 are provided in the supporting part 1. The weight reducing holes 12 can reduce the weight on one hand and can also reduce material consumption and production costs on the other hand.

Preferably, referring to FIG. 2 to FIG. 6, the end of the connection part 2 far from the recess 3 is provided with an accommodating cavity 21, a plug accommodating member 4 is disposed in the accommodating cavity 21, an end face of the plug accommodating member 4 far from the recess 3 is provided with insertion holes 411 adapted to insert a plug 6, the magnet 5 is located in the accommodating cavity 21, and the magnet 5 is located on an inner side of the end face of the plug accommodating member 4 far from the recess 3. In the above arrangement mode, the magnet 5 is located on the inner side, so that the magnet 5 can be protected and protected from cracks caused by bumps. The end face of the plug accommodating member 4 far from the recess 3 is provided with the insertion holes 411 adapted to insert the plug 6, so that the user can insert the plug 6 of a mobile phone 100, a tablet computer 200, a laptop or another electronic product into the insertion holes 411 when going on a business trip or traveling, thereby preventing the plug 6 from being exposed to scratch other items. That is, the multifunctional stand in the present invention has one more function of accommodating the plug 6.

In particular, a plurality of supporting plates 211 are disposed on an inner wall of the accommodating cavity 21; the plurality of supporting plates 211 are annularly distributed, and tops of the plurality of supporting plates 211 are adapted to form supporting faces 212; the magnet 5 is annular; the plug accommodating member 4 includes a body part 41 and an end cap part 42, the end cap part 42 is farther from the recess 3 than the body part 41, the insertion holes 411 are provided in the body part 41, the body part 41 is adapted to penetrate through a center of the magnet 5, and the magnet 5 is adapted to be clamped between the end cap part 42 and the supporting faces 212. That is, in the present invention, the magnet 5 is limited between the end cap part 42 and the supporting faces 212, so fixation reliability of the magnet 5 can be increased. The body part 41 penetrates through the center of the magnet 5, and the end cap part 42 abuts against the magnet 5, making integrity of the multifunctional stand of the present invention higher.

Preferably, a magnet 5 soft rubber sleeve sleeves an outer side of the magnet 5. The magnet 5 soft rubber sleeve has a function of buffering. Therefore, the magnet 5 soft rubber sleeve sleeves the outer side of the magnet 5 and can further protect the magnet 5. Generally, to fix the magnet 5 to the magnet 5 soft rubber sleeve more reliably, the magnet 5 can be fixed to the magnet 5 soft rubber sleeve in a glue dispensing manner.

Figure 6:
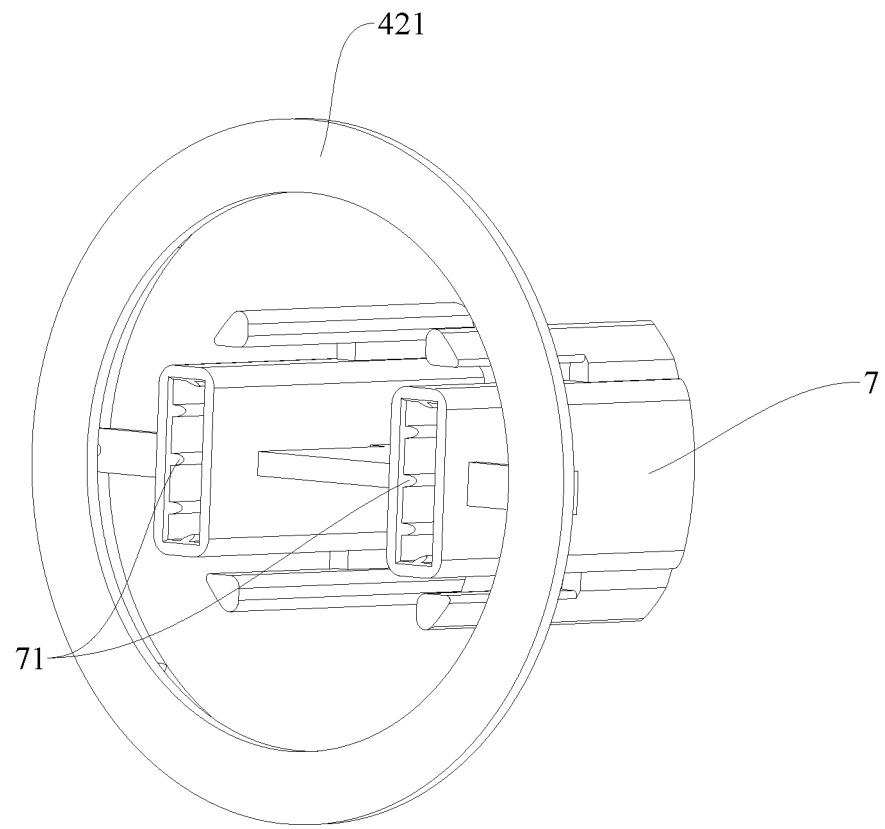
FIG. 6 is a schematic diagram illustrating cooperation of end cap annular soft rubber and an insertion hole soft rubber sleeve in a multifunctional stand of the present invention.

Preferably, referring to FIG. 3 and FIG. 6, an insertion hole soft rubber sleeve 7 is disposed in each insertion hole 411, and end face annular soft rubber 421 is disposed on the end face of the plug accommodating member 4 far from the recess 3. The insertion hole soft rubber sleeve 7 is disposed in each insertion hole 411, so that abrasion to the plug 6 can be reduced, and the plug 6 can be inserted more firmly without getting loose easily. The end face annular soft rubber is disposed on the end face of the plug accommodating member 4 far from the recess 3. On one hand, the end face annular soft rubber can play a role in buffering, that is, the end face annular soft rubber reduces impact and protects a magnetically attracted item from damage when the multifunctional stand is magnetically attracted to the item. On the other hand, the end face annular soft rubber 421 itself can increase friction force and attraction force between the multifunctional stand and the item, thereby enhancing connection reliability of the multifunctional stand.

Preferably, the insertion hole soft rubber sleeves 7 and the end face annular soft rubber 421 are integrally molded. Integral molding can be conducive to machining and enhance integrity of the multifunctional stand.

Preferably, referring to FIG. 6, ribs 71 are disposed in each insertion hole soft rubber sleeve 7 in a length direction of the insertion hole soft rubber sleeve 7. The ribs 71 can further improve insertion firmness of the plug 6.

Preferably, the plug accommodating member 4 is welded to the connection part 2 through ultrasonic waves. That is, in the present invention, the plug accommodating member 4 is fixedly connected to the connection part 2 in a welding manner through ultrasonic waves, and the plug accommodating member 4 fixedly connected to the connection part 2 fixes the magnet 5 in the accommodating cavity 21, so that the magnet 5 is fixed.

Preferably, a material of the plug accommodating member 4 is ABS engineering plastic; a material of the supporting part soft rubber sleeve 11 is TPE; a material of the insertion hole soft rubber sleeves 7 and a material of the end face annular soft rubber 421 are both TPE; and a material of the supporting part 1 and a material of the connection part 2 are ABS engineering plastic. ABS engineering plastic, i.e., PC+ABS (engineering plastic alloy), is named as plastic alloy in chemical industry. The reason for the name PC+ABS is that this material has excellent heat resistance and weather resistance, size stability and impact resistance of PC resin and also has excellent processing fluidity of ABS resin. Therefore, the ABS engineering plastic is applied to thin-walled and complex-shaped products, and the ABS engineering plastic can keep excellent performance and keep formability of a material formed by plastic and an ester. TPE is short for thermoplastic elastomer and is an abbreviation of thermoplastic rubber. TPE is an elastomer that has elasticity of rubber at normal temperature and has plastic formability at high temperature.

Figure 7:
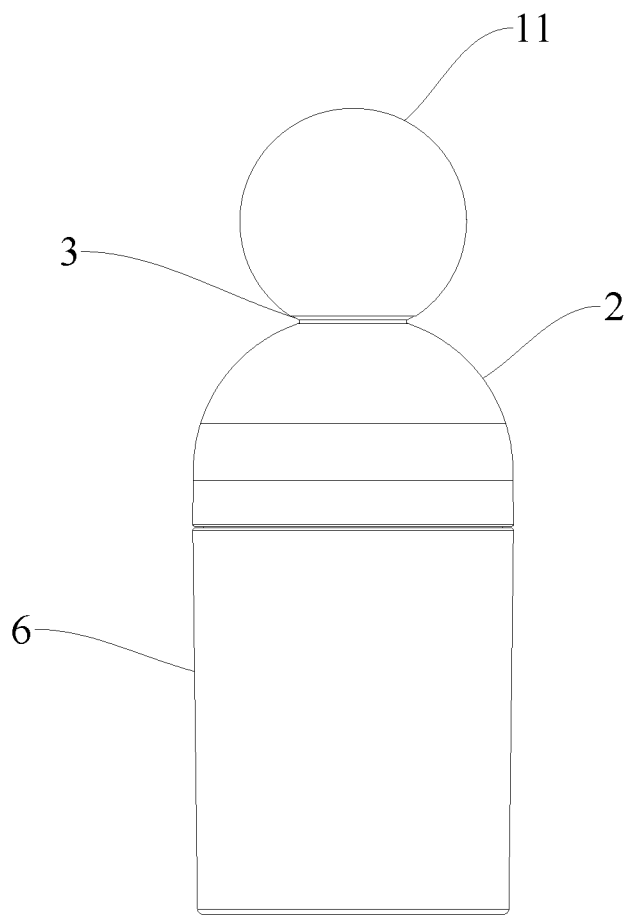
FIG. 7 is a schematic diagram of a stand assembly of the present invention.
Figure 8:
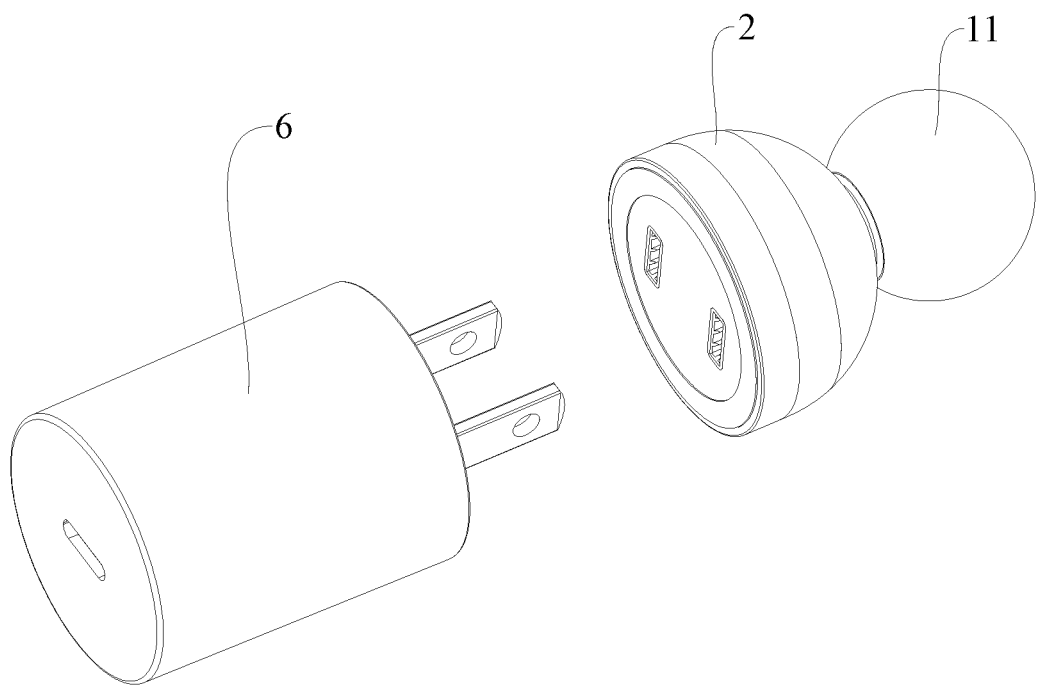
FIG. 8 is an exploded view of a stand assembly of the present invention.

As shown in FIG. 7 and FIG. 8, the present invention further provides a stand assembly. The stand assembly includes: a plug 6 and the multifunctional stand described above, where the plug 6 is adapted to be inserted into the insertion holes 411 of the multifunctional stand. The plug 6 can be inserted into the insertion holes 411 of the multifunctional stand, so that a metal end of the plug 6 can be prevented from being exposed to scratch other items in a suitcase or a backpack when a user goes on a business trip or travels. In the present invention, to reduce a size of the stand assembly, the plug 6 can be a gallium nitride plug. To improve consistency of the stand assembly, the plug 6 may be cylindrical. That is, a shape of the plug 6 is matched with a shape of the multifunctional stand, and in this way, the stand assembly can be more attractive.

The above only describes the embodiments of the present invention, but does not limit the patent scope of the present invention. Equivalent structures or equivalent flow transformations made according to the contents of the specification and the accompanying drawings of the present invention, directly or indirectly applied to another relevant technical fields, all fall within the patent protection scope of the present invention in a similar way.

What is claimed is:

1. A multifunctional stand, comprising: a supporting part (1), a connection part (2) and a magnet (5), wherein the supporting part (1) is connected to the connection part (2), and a joint of the supporting part (1) and the connection part (2) is recessed inwards to form a recess (3); the magnet (5) is disposed at an end of the connection part (2) far from the recess (3); and a material of the supporting part (1) and a material of the connection part (2) are ABS engineering plastic;

wherein the end of the connection part (2) far from the recess (3) is provided with an accommodating cavity (21), a plug accommodating member (4) is disposed in the accommodating cavity (21), an end face of the plug accommodating member (4) far from the recess (3) is provided with insertion holes (411) adapted to insert a plug (6), the magnet (5) is located in the accommodating cavity (21), and the magnet (5) is located on an inner side of the end face of the plug accommodating member (4) far from the recess (3).

2. The multifunctional stand according to claim 1, wherein the end of the connection part (2) far from the recess (3) has a flat abutting surface, and the magnet (5) is located on an inner side of the flat abutting surface.

3. The multifunctional stand according to claim 1, wherein the supporting part (1) is spherical.

4. The multifunctional stand according to claim 3, wherein the connection part (2) is hemispherical, and a spherical end of the connection part (2) is connected to the supporting part (1).

5. The multifunctional stand according to claim 1, wherein a supporting part soft rubber sleeve (11) sleeves an outer side of the supporting part (1).

6. The multifunctional stand according to claim 5, wherein a material of the supporting part soft rubber sleeve (11) is TPE.

7. The multifunctional stand according to claim 1, wherein the supporting part (1) and the connection part (2) are integrally molded.

8. The multifunctional stand according to claim 1, wherein weight reducing holes (12) are provided in the supporting part (1).

9. The multifunctional stand according to claim 1, wherein a plurality of supporting plates (211) are disposed on an inner wall of the accommodating cavity (21); the plurality of supporting plates (211) are annularly distributed, and tops of the plurality of supporting plates (211) are adapted to form supporting faces (212); the magnet (5) is annular; the plug accommodating member (4) comprises a body part (41) and an end cap part (42), the end cap part (42) is farther from the recess (3) than the body part (41), the insertion holes (411) are provided in the body part (41), the body part (41) is adapted to penetrate through a center of the magnet (5), and the magnet (5) is adapted to be clamped between the end cap part (42) and the supporting faces (212).

10. The multifunctional stand according to claim 9, wherein a magnet (5) soft rubber sleeve sleeves an outer side of the magnet (5).

11. The multifunctional stand according to claim 1, wherein an insertion hole soft rubber sleeve (7) is disposed in each insertion hole (411), and end face annular soft rubber (421) is disposed on the end face of the plug accommodating member (4) far from the recess (3).

12. The multifunctional stand according to claim 11, wherein the insertion hole soft rubber sleeves (7) and the end face annular soft rubber (421) are integrally molded.

13. The multifunctional stand according to claim 12, wherein ribs (71) are disposed in each insertion hole soft rubber sleeve (7) in a length direction of the insertion hole soft rubber sleeve (7).

14. The multifunctional stand according to claim 11, wherein a material of the insertion hole soft rubber sleeves (7) and a material of the end face annular soft rubber (421) are both TPE.

15. The multifunctional stand according to claim 1, wherein the plug accommodating member (4) is welded to the connection part (2) through ultrasonic waves.

16. The multifunctional stand according to claim 1, wherein a material of the plug accommodating member (4) is ABS engineering plastic.

17. A stand assembly, comprising: a plug (6) and the multifunctional stand according to claim 1, wherein the plug (6) is adapted to be inserted into the insertion holes (411) of the multifunctional stand.

18. The stand assembly according to claim 17, wherein the plug (6) is a gallium nitride plug.

\* \* \* \* \*